United States Patent
Zhu

(10) Patent No.: US 10,570,982 B2
(45) Date of Patent: Feb. 25, 2020

(54) VIBRATION DAMPER FOR A MOTOR VEHICLE AND A METHOD FOR PRODUCING A PRESS FIT BETWEEN A DAMPER INNER TUBE AND AT LEAST ONE SEPARATING PLATE

(71) Applicants: ThyssenKrupp Bilstein GmbH, Ennepetal (DE); thyssenkrupp AG, Essen (DE)

(72) Inventor: Peng Zhu, Dortmund (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/708,285

(22) Filed: Sep. 19, 2017

(65) Prior Publication Data
US 2018/0094691 A1  Apr. 5, 2018

(30) Foreign Application Priority Data
Sep. 30, 2016  (DE) .................. 10 2016 219 117

(51) Int. Cl.
*F16F 9/00* (2006.01)
*F16F 9/32* (2006.01)
(Continued)

(52) U.S. Cl.
CPC ............ *F16F 9/3235* (2013.01); *B60G 13/08* (2013.01); *F16F 9/3207* (2013.01);
(Continued)

(58) Field of Classification Search
CPC ........... F16F 9/325; F16F 9/3257; F16F 9/185
(Continued)

(56) References Cited

U.S. PATENT DOCUMENTS 5,040,645 A * 8/1991 Volpel .................. F16F 9/0209
188/287
5,540,309 A * 7/1996 Huang .................. F16F 9/3235
188/266.6
(Continued)

FOREIGN PATENT DOCUMENTS

CN  200993183 Y  12/2007
DE  4342883 A  6/1995
(Continued)

OTHER PUBLICATIONS

Machine translation of DE 19508853 (no date).*
(Continued)

*Primary Examiner* — Nicholas J Lane
(74) *Attorney, Agent, or Firm* — thyssenkrupp North American, Inc.

(57) ABSTRACT

A vibration damper for a motor vehicle may comprise a damper outer tube, a damper inner tube having a lateral surface of the damper inner tube and arranged coaxially in the damper outer tube, a separating plate arranged coaxially in a region of the lateral surface of the damper inner tube, and a sealing element arranged coaxially circumferentially on the damper inner tube on the separating plate. In a region of the separating plate arranged coaxially on the lateral surface of the damper inner tube, a groove for the separating plate may be formed on the lateral surface of the damper inner tube. The separating plate may be arranged in the groove, and the connection between the groove and the separating plate may be press fit, at least in the radial direction.

14 Claims, 2 Drawing Sheets

(51) Int. Cl.
*B60G 13/08* (2006.01)
*F16F 9/18* (2006.01)

(52) U.S. Cl.
CPC .......... *F16F 9/3257* (2013.01); *F16F 9/3271* (2013.01); *B60G 2206/41* (2013.01); *B60G 2206/82092* (2013.01); *F16F 9/185* (2013.01); *F16F 2226/045* (2013.01); *F16F 2230/00* (2013.01); *F16F 2230/0082* (2013.01); *F16F 2230/02* (2013.01)

(58) Field of Classification Search
USPC .......... 188/266.6, 315, 318, 322.16, 322.19, 188/322.2
See application file for complete search history.

(56) References Cited

U.S. PATENT DOCUMENTS

| | | | | |
|---|---|---|---|---|
| 5,852,952 | A * | 12/1998 | Okamoto | F16H 61/30 74/473.11 |
| 6,283,259 | B1 * | 9/2001 | Nakadate | F16F 9/325 188/299.1 |
| 7,950,506 | B2 * | 5/2011 | Nowaczyk | F16F 9/466 188/266.6 |
| 2006/0283677 | A1 | 12/2006 | Schmidt | |
| 2009/0120749 | A1 * | 5/2009 | Kolz | F16F 9/185 188/322.19 |
| 2009/0236193 | A1 * | 9/2009 | Schmidt | F16F 9/466 188/322.13 |
| 2010/0059937 | A1 * | 3/2010 | Castleman | F16J 15/3236 277/309 |
| 2010/0193309 | A1 | 8/2010 | Gruber | |
| 2015/0316119 | A1 | 11/2015 | Lehnen | |

FOREIGN PATENT DOCUMENTS

| | | | | |
|---|---|---|---|---|
| DE | 4410996 | C | 6/1995 | |
| DE | 19508853 | A1 * | 8/1996 | ............. F16F 9/325 |
| DE | 19844555 | A | 4/2000 | |
| DE | 102007036017 | A | 2/2009 | |
| DE | 102012111474 | A | 5/2014 | |
| JP | H08296690 | A | 11/1996 | |
| JP | H0995245 | A | 4/1997 | |
| JP | H09137757 | A | 5/1997 | |
| JP | 2002317852 | A | 10/2002 | |
| JP | 2010101371 | A | 5/2010 | |
| JP | 2015085805 | A | 5/2015 | |
| WO | 2015188979 | A | 12/2015 | |
| WO | WO-2016151015 | A1 * | 9/2016 | ........... F16F 9/3257 |

OTHER PUBLICATIONS

"Geometrical product specifications (GPS)—ISO code system for tolerances on linear sizes," ISO 286-1 (May 2010).*
English abstract of DE19844555A.
English abstract of DE4410996C.

* cited by examiner

US 10,570,982 B2

VIBRATION DAMPER FOR A MOTOR VEHICLE AND A METHOD FOR PRODUCING A PRESS FIT BETWEEN A DAMPER INNER TUBE AND AT LEAST ONE SEPARATING PLATE

CROSS-REFERENCE TO RELATED APPLICATION

This application is a non-provisional application claiming priority to German Patent Application No. DE 10 2016 219 117.9, which was filed Sep. 30, 2016, the entire content of which is hereby incorporated by reference herein.

FIELD

The present disclosure generally relates to vibration dampers and to methods of producing press fit connections between damper inner tubes and separating plates.

BACKGROUND

Vibration dampers for motor vehicles are generally known in a plurality of embodiments in the prior art. For example, as hydraulic vibration dampers for motor vehicles, comprising a damper cylinder which is filled with damping fluid and in which there slides a damping piston which is connected to a piston rod, is provided with pressure-controlled throttle valves and divides the damper cylinder into two working chambers, and in which a bypass passage is provided for adjusting the damping force, the flow cross-section of which bypass passage may be controlled by a bypass valve system arranged outside the vibration damper and accommodated in a tubular valve housing. In dampers of this type, the outer tube is formed similarly to the inner tube as a circular cylinder and surrounds the inner tube concentrically. Such dampers are installed in all possible installation positions, i.e. in the entire range between a horizontal and a vertical installation position, and have to remain fully functional in such an installation position.

German Patent Publication No. DE 43 42 883 A1 discloses a hydraulic, controllable vibration damper for motor vehicles having a damper cylinder containing the damping fluid.

One problem with the embodiments known in the prior art is the sealing of the inner tube with respect to the outer tube. Often the components installed for sealing result in noise emissions that can usually be attributed to relative movements between these components and/or with the inner tube.

Thus a need exists for improved vibration dampers for motor vehicles and an improved method for producing a vibration dampers and, in particular, the arrangement of components on and/or in damper tubes, in which the above-mentioned disadvantages are prevented.

DETAILED DESCRIPTION

Figure 1:
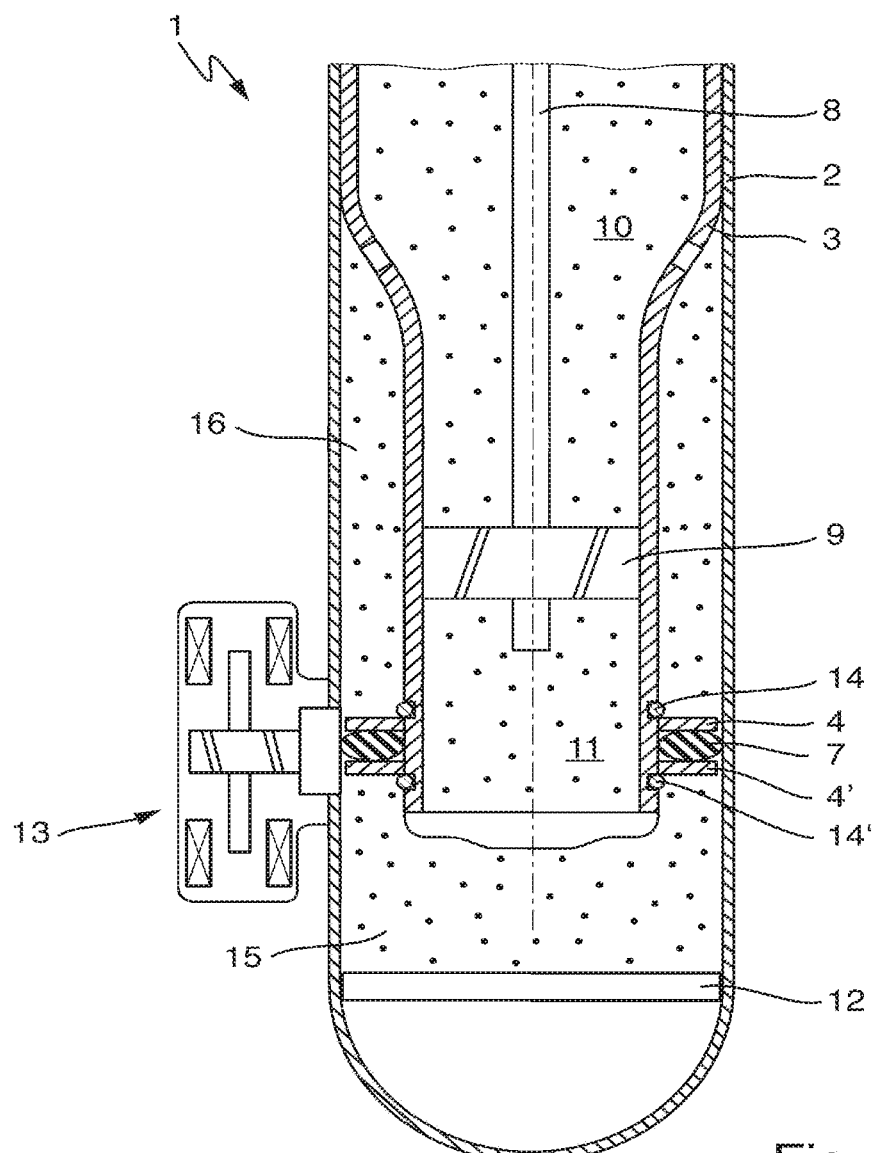
FIG. 1 is a schematic view of a longitudinal section through a prior art vibration damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The vibration dampers according to the present disclosure are advantageous over conventional vibration dampers in that noise emissions, for example, caused by an axial displacement of components arranged on and/or in damper tubes, for example, plates, in particular, separating plates, snap rings, and combinations thereof, are at least partially reduced. In particular, the above-mentioned components may be at least partially composed of metal.

The methods according to the present disclosure for producing a press fit between at least one separating plate and a damper inner tube are advantageous over conventional methods in that the methods can be carried out simply and do not require snap rings.

The subject matter of the present disclosure generally concerns vibration dampers for motor vehicles. In some examples, a vibration damper may comprise a damper outer tube, a damper inner tube having a lateral surface of the damper inner tube, wherein at least one separating plate is arranged coaxially in a region of the lateral surface of the damper inner tube, wherein the damper inner tube is arranged coaxially in the damper outer tube, at least one sealing element, wherein the at least one sealing element is arranged coaxially circumferentially on the damper inner tube on the at least one separating plate, wherein, in the region of the at least one separating plate arranged coaxially on the lateral surface of the damper inner tube, a groove for each of the at least one separating plate is formed on the lateral surface of the damper inner tube, wherein one of the at least one separating plate is arranged in each groove formed, wherein the connection between the groove formed and the at least one separating plate arranged in the groove in each case is formed, at least in the radial direction, as a press fit.

The present disclosure also generally concerns methods for producing a press fit between a damper inner tube and at least one separating plate. In some examples, a method may comprise the following steps:

a) providing the damper inner tube with an outer diameter of the damper inner tube and a separating-plate region;

b) providing the at least one separating plate with an inner diameter of the separating plate, wherein the inner diameter of the separating plate is smaller than the damper-inner-tube outer diameter of the damper inner tube provided in step a);

c) reducing the outer diameter sectionally in the separating-plate region of the damper inner tube provided in step a) to an outer diameter of the damper inner tube which is smaller than the separating-plane inner diameter of the at least one separating plate provided in step b), wherein the sectional reduction of the outer diameter in the longitudinal direction of the damper inner tube provided in step a) is effected from an end of the damper inner tube to form a reduction region;

d) producing a groove in each case for at least one of the at least one separating plate provided in step b) in the reduction region formed in step c) for receiving the one separating plate in each case coaxially to the damper inner tube in the groove (5, 5') produced in each case for a separating plate (4, 4');

e) positioning the at least one separating plate provided in step b) in the groove respectively produced in step d) coaxially to the damper inner tube;

f) radially widening the outer diameter of the damper inner tube sectionally at least in the separating-plate region, formed in step c), of the damper inner tube, at least in the region of the at least one separating plate positioned in step e), to form a press fit between the sectionally radially widened outer diameter of the damper inner tube and the at least one separating plate positioned in step e).

Within the framework of the present disclosure, a separating plate may refer to a separating element that can be arranged coaxially on an additionally provided damper inner tube, wherein the separating element comprises a geometrical form for positioning an additionally provided sealing element at least in the longitudinal direction of the additionally provided damper inner tube. In particular, the separating element may produce a form-fitting connection with respect to the additionally provided sealing element in the longitudinal direction of the additionally provided damper inner tube. For example, with an additionally provided sealing element positioned in the longitudinal direction of the additionally provided damper inner tube, the separating element arranged on an additionally provided damper inner tube fluidically mutually separates regions between which the separating element is arranged for effecting separation. For example, the additionally provided sealing element can be radially circumferentially arranged on the outer circumference of a separating plate. In particular, a separating plate may be arranged on an additionally provided damper inner tube in such a way that the separating plate does not have contact with an additionally provided damper outer tube arranged coaxially around the damper inner tube, wherein an additionally provided sealing element positioned opposite the damper inner tube in the longitudinal direction has a sealing function with respect to the damper outer tube. For example, the separating plate according to the present disclosure may have a material composition that is selected from a group of metallic materials, polymer materials, plastics materials, rubber materials, caoutchouc materials, and combinations thereof.

For example, a vibration damper may be formed for a chassis of a vehicle, comprising a damper tube that is at least partially filled with damping fluid and is arranged in a damper outer tube. A piston rod may be moved back and forth in the damper inner tube, wherein a working piston may be moved with the piston rod, which working piston divides the interior of the damper inner tube into a working chamber on the piston-rod side and a working chamber remote from the piston rod.

In some examples, the at least one sealing element is arranged radially circumferentially on the outer circumference of the at least one separating plate. For example, the at least one separating plate and the at least one sealing element may be in one piece.

In some examples, the press fit formed at least in the radial direction comprises an excess in the radial direction of at least 12 µm according to ISO 286-1, year 2010.

In some examples, a bead is formed in a transition region between the surface of the separating plate and the lateral surface of the damper inner tube. The formation of the bead results from material displacements caused by forming processes of the damper inner tube. In particular, the bead may be formed in a region between the surface of the separating plate and the lateral surface of the damper inner tube in contact therewith.

In particular, the bead may be formed in such a way as to form a press fit between the separating plate and the bead lying against it and to at least partially reduce relative movements of the separating plate with respect to the damper inner tube.

According to some examples, the groove formed for each of the at least one separating plate may at least partially comprise a trapezoidal contour and the at least one separating plate arranged in the respective groove may at least partially comprise a trapezoidal inner contour before the formation of the press fit in at least the radial direction.

In some examples, the trapezoidal contour and the trapezoidal inner ring contour are formed in each case as an equal-sided trapezium having a base and two mirror-symmetrical sides.

Furthermore, in some examples, the angles of the trapezoidal inner contour that are enclosed between the base and one of the two mirror-symmetrical sides in each case are greater than the respectively immediately adjacent enclosed angle of the trapezoidal contour of the groove formed for each of the at least one separating plate.

In some examples, the angles of the trapezoidal inner contour that are enclosed between the base and one of the two mirror-symmetrical sides in each case are arranged in a region of 92° to 135°.

Further, the production of a groove in step d) may also comprise production of a plurality of grooves.

In some examples, the production of a groove in step d) may be carried out at least partially by means of a cutting and/or deforming machining process.

In another example, a trapezoidal contour of the groove may be at least partially formed during the production of a groove in step d).

In some examples, the at least one separating plate provided in step b) may at least partially comprise a trapezoidal inner contour.

In some examples, the at least sectional radial widening of the outer diameter of the damper inner tube in step f) may be carried out at least partially by means of an axial and/or radial machining process relative to the longitudinal direction of the damper inner tube provided in step a).

In FIG. 1, a longitudinal section through a prior art vibration damper is illustrated schematically. The vibration damper 1 exhibits a damper outer tube 2 in which a damper inner tube 3 is arranged. A piston rod 8, which may be moved axially back and forth, is arranged in the damper inner tube 3 with a working piston 9 arranged on the piston rod 8. The working piston 9 divides a working chamber 10 on the piston-rod side and a working chamber 11 remote from the piston rod. A separating piston 12 is arranged, at the end, in the damper outer tube 2. The damper inner tube 3 exhibits, at one end, a sectional reduction of the outer diameter where the outer diameter of the damper inner tube is reduced. In the region of the sectional reduction of the outer diameter, two snap rings 14, 14' are arranged coaxially on the damper-inner-tube lateral surface of the damper inner tube 3, in two grooves provided for this purpose. Two separating plates 4, 4' are arranged in the region between the grooves. A sealing element 7 is arranged between the two separating plates 4, 4'. The separating plates 4, 4' with the sealing element 7 arranged between them separate a working chamber 16 facing away from the tapering end of the damper inner tube from a working chamber 15 facing the tapering end of the damper inner tube. Damping medium (illustrated by dots) can arrive in the working chamber 16 facing away from the tapering end of the damper inner tube from the working chamber 15 facing the tapering end of the damper inner tube, and back again, via an additional attachment unit 13.

Figure 2:
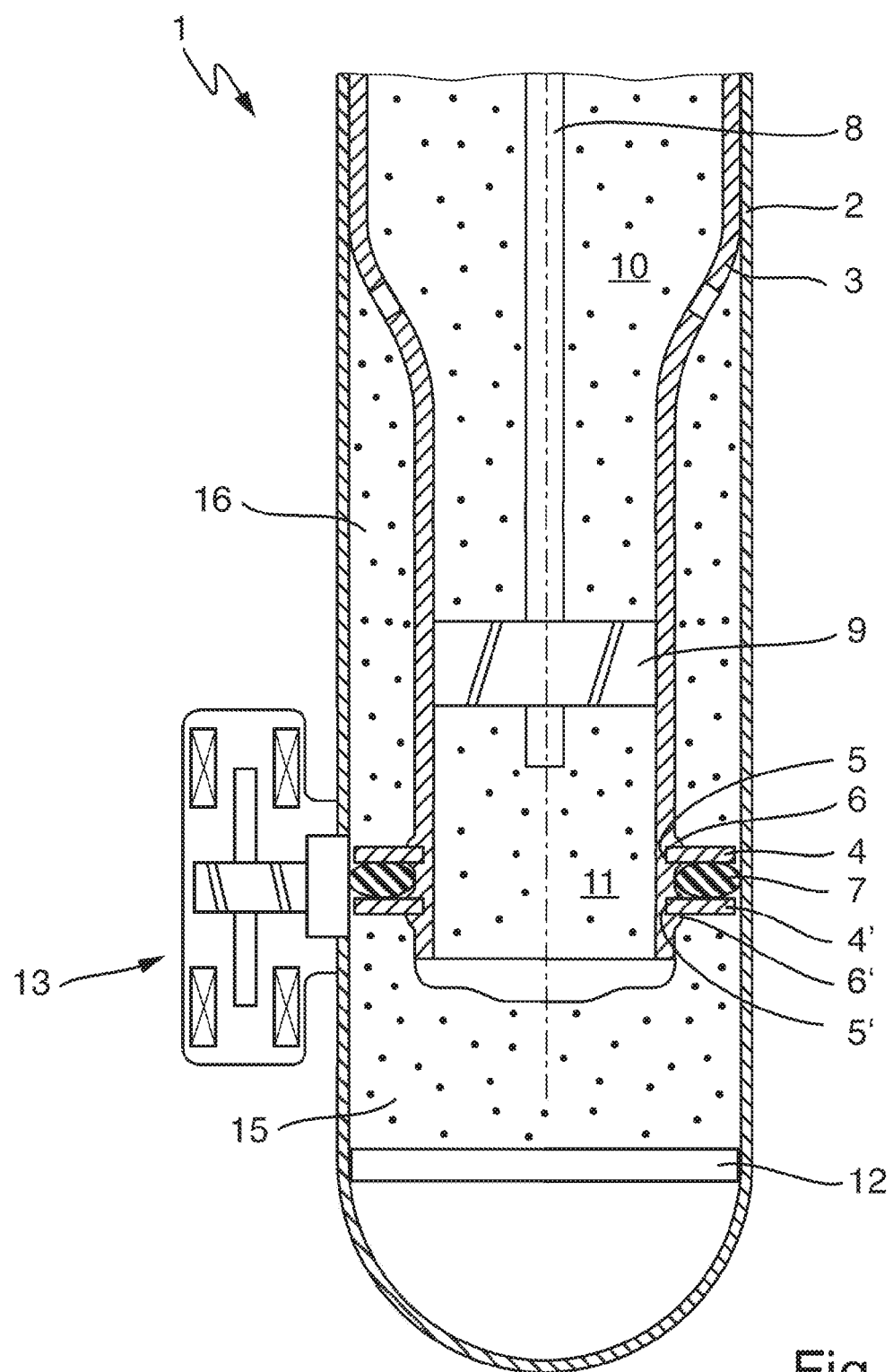
FIG. 2 is a schematic view of a longitudinal section through an example vibration damper of the present disclosure.

In FIG. 2, a longitudinal section through an example vibration damper of the present disclosure is illustrated schematically. The vibration damper 1 exhibits the damper outer tube 2 in which the damper inner tube 3 may be arranged. The piston rod 8, which may be moved axially back and forth, is arranged in the damper inner tube 3 with the working piston 9 arranged on the piston rod 8. The working piston 9 may divide the working chamber 10 on the piston-rod side and the working chamber 11 remote from the piston rod. A separating piston 12 may be arranged, at the end, in the damper outer tube 2. In the example shown, the damper inner tube 3 exhibits, at one end, a sectional reduction of the outer diameter where the outer diameter of the damper inner tube is reduced. In the region of the sectional reduction of the outer diameter, two grooves 5, 5' may be formed on the lateral surface of the damper inner tube, in which grooves the respective separating plate 4, 4' may be arranged coaxially to the damper inner tube 3. The separating plates 4, 4' may be arranged with press fit in each respective groove 5, 5' on the lateral surface of the damper inner tube, wherein a bead 6, 6' formed by the production of the press fit is illustrated at the transition region(s) between the surface of the separating plate 4, 4' and the lateral surface of the damper inner tube. The sealing element 7 may be arranged between the separating plates 4, 4'. The separating plates 4, 4' with the sealing element 7 arranged between them separate the working chamber 16 facing away from the tapering end of the damper inner tube from the working chamber 15 facing the tapering end of the damper inner tube. Damping medium (illustrated by dots) can arrive in the working chamber 16 facing away from the tapering end of the damper inner tube from the working chamber 15 facing the tapering end of the damper inner tube, and back again, via the additional attachment unit 13.

Vibration dampers and methods for producing a fit between at least one separating plate and a damper inner tube may be applicable to chassis of motor vehicles, but those having ordinary skill in the art will understand that the present disclosure is not limited to chassis of motor vehicles.

LIST OF REFERENCE NUMERALS

1=Vibration damper
2=Damper outer tube
3=Damper inner tube
4, 4'=Separation plate(s)
5, 5'=Groove(s)
6, 6'=Bead(s)
7=Sealing element
8=Piston rod
9=Working piston
10=Working chamber on the piston-rod side
11=Working chamber remote from the piston rod
12=Separating piston
13=Additional attachment unit
14, 14'=Snap ring(s)
15=Working chamber facing the tapering end of the damper inner tube
16=Working chamber facing away from the tapering end of the damper inner tube.

What is claimed is:

1. A vibration damper for a motor vehicle, the vibration damper comprising:
   a damper outer tube;
   a damper inner tube disposed coaxially in the damper outer tube, the damper inner tube having a lateral surface with a groove;
   a separating plate disposed coaxially with the damper inner tube in a region of the lateral surface of the damper inner tube, wherein the separating plate is disposed in the groove of the lateral surface of the damper inner tube, wherein a press-fit connection is formed at least in a radial direction between the groove and the separating plate; and
   a sealing element disposed coaxially circumferentially on the damper inner tube on the separating plate, wherein the sealing element is in direct contact with the damper inner tube.

2. The vibration damper of claim 1 wherein the press-fit connection comprises an excess in the radial direction of at least 12 µm according to ISO 286-1 (2010).

3. The vibration damper of claim 1 further comprising a bead in a transition region between a surface of the separating plate and the lateral surface of the damper inner tube.

4. The vibration damper of claim 1 wherein the groove comprises a trapezoidal contour and the separating plate disposed in the groove comprises a trapezoidal inner contour, at least prior to formation of the press-fit connection.

5. The vibration damper of claim 1 wherein the groove comprises a trapezoidal contour and the separating plate disposed in the groove comprises a trapezoidal inner contour.

6. The vibration damper of claim 5 wherein each of the trapezoidal contour and the trapezoidal inner contour is configured as an equal-sided trapezium that has a base and two mirror-symmetrical sides.

7. The vibration damper of claim 6 wherein angles of the trapezoidal inner contour of the separating plate that are enclosed between the base and the two mirror-symmetrical sides are greater, respectively, than angles of the trapezoidal contour of the groove that are enclosed between the base and the two mirror-symmetrical sides.

8. The vibration damper of claim 7 wherein the angles of the trapezoidal inner contour that are enclosed between the base and the two mirror-symmetrical sides are between 92° and 135°.

9. The vibration damper of claim 1 wherein the separating plate is a first separating plate and the groove is a first groove, wherein the lateral surface of the damper inner tube has a second groove that is spaced apart from the first groove, wherein the first and second separating plates are disposed respectively in the first and second grooves.

10. A vibration damper for a motor vehicle, the vibration damper comprising:
    a damper outer tube;
    a damper inner tube disposed coaxially in the damper outer tube, the damper inner tube having a lateral surface with a groove;
    a separating plate disposed coaxially with the damper inner tube in a region of the lateral surface of the damper inner tube, wherein the separating plate is disposed in the groove of the lateral surface of the damper inner tube, wherein a press-fit connection is formed at least in a radial direction between the groove and the separating plate;

a sealing element disposed coaxially circumferentially on the damper inner tube on the separating plate; and a bead in a transition region between a surface of the separating plate and the lateral surface of the damper inner tube.

11. The vibration damper of claim 10 wherein the groove comprises a trapezoidal contour and the separating plate disposed in the groove comprises a trapezoidal inner contour.

12. The vibration damper of claim 11 wherein each of the trapezoidal contour and the trapezoidal inner contour is configured as an equal-sided trapezium that has a base and two mirror-symmetrical sides.

13. The vibration damper of claim 12 wherein angles of the trapezoidal inner contour of the separating plate that are enclosed between the base and the two mirror-symmetrical sides are greater, respectively, than angles of the trapezoidal contour of the groove that are enclosed between the base and the two mirror-symmetrical sides.

14. The vibration damper of claim 13 wherein the angles of the trapezoidal inner contour that are enclosed between the base and the two mirror-symmetrical sides are between 92° and 135°.

* * * * *